(12) United States Patent
Geisler et al.

(10) Patent No.: US 6,995,663 B2
(45) Date of Patent: Feb. 7, 2006

(54) DRIVING WORKLOAD ESTIMATION

(75) Inventors: Scott P. Geisler, Clarkston, MI (US); Thomas William Creech, Clarkston, MI (US); Lisa Schreiner, Rochester Hills, MI (US); Stefano Marica, Farmington Hills, MI (US); Flavio Nardi, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 86 days.

(21) Appl. No.: 10/662,957

(22) Filed: Sep. 15, 2003

(65) Prior Publication Data

US 2004/0113799 A1    Jun. 17, 2004

Related U.S. Application Data

(63) Continuation-in-part of application No. 10/285,371, filed on Oct. 31, 2002.

(51) Int. Cl.
*G01M 17/00* (2006.01)
*G08B 23/00* (2006.01)

(52) U.S. Cl. ............... 340/439; 340/438; 340/576; 701/1

(58) Field of Classification Search ............... 340/438, 340/439, 576; 180/272; 701/1, 35
See application file for complete search history.

(56) References Cited

U.S. PATENT DOCUMENTS

| | | | | |
|---|---|---|---|---|
| 5,521,580 A | * | 5/1996 | Kaneko et al. | 340/439 |
| 6,060,989 A | * | 5/2000 | Gehlot | 340/576 |
| 6,061,610 A | * | 5/2000 | Boer | 701/1 |
| 6,330,499 B1 | * | 12/2001 | Chou et al. | 701/33 |
| 6,356,812 B1 | * | 3/2002 | Cragun | 701/1 |
| 6,580,984 B2 | * | 6/2003 | Fecher et al. | 701/36 |
| 2002/0120374 A1 | * | 8/2002 | Douros et al. | 701/29 |
| 2002/0169529 A1 | * | 11/2002 | Kim | 701/33 |

* cited by examiner

*Primary Examiner*—Brent A. Swarthout
*Assistant Examiner*—Anne V. Lai
(74) *Attorney, Agent, or Firm*—Kathryn A. Marra

(57) ABSTRACT

A method for estimating workload placed on the driver of a vehicle. The method comprises receiving workload estimation data. Driving conditions responsive to the workload estimation data are detected. An impact value of at least one of the driving conditions is calibrated. The impact values are combined to determine a current driving workload estimate. The current driving workload estimate is output.

27 Claims, 4 Drawing Sheets

| Input | Relative Workload Effect—Logical Operands | |
|---|---|---|
| 202—Vehicle Speed | 70 mph > 50–70 mph | ⎫ |
| | 50–70 mph > 20–50 mph | ⎬ 302 |
| | 20–50 mph > 0–20 mph | ⎭ |
| 204—Turn Signal Status | Lane Change > Lane Maintenance | ⎫ 304 |
| | Turn > Maintain Straight heading | ⎭ |
| 206—ABS/TCS/Stability | ABS/TCS + Stability active > ABS/TCS | ⎫ |
| | Stability active > not active | ⎬ 306 |
| | ABS/TCS active > not active | ⎭ |
| 214—Headlamp Status | Night > Day | 308 |
| 216—Wiper Status | Precipitation > None | 310 |
| 220—Outside Air Temperature | Snow > Rain | 312 |
| 224—Time of Day | Periodic function to reflect greater risk of driving at certain times of the day. | 314 |
| 226—Radio Information | Manipulating radio > No Radio Task | 316 |
| 228—Phone Status | Phone dialing/conversation > None | 318 |

*FIG. 3*

DRIVING WORKLOAD ESTIMATION

CROSS REFERENCE TO RELATED APPLICATIONS

The present application is a continuation-in-part of application Ser. No. 10/285,371, filed Oct. 31, 2002, which is herein incorporated by reference in its entirety.

BACKGROUND OF THE INVENTION

The present disclosure relates generally to driving workload estimation and in particular, to a method of assessing the marginal effect of vehicle conditions, environment conditions and current task conditions on the driver of a vehicle.

Vehicles, such as automobiles, generally feature one or more displays to provide locally obtained information related to a current state of the vehicle. The display is positioned within the vehicle such that a driver of the vehicle can view information while driving the vehicle. For example, the display can provide information on a windshield, a dashboard or a steering wheel. Typically, each display contains one or more windows. Locally obtained information, such as the speed of the vehicle, the direction traveled by the vehicle, the outside air temperature, whether the air conditioner is in use, whether the hazard light is on, fuel status of the vehicle, and the like, is provided in these windows. In addition, information collected from vehicle sensors can be used to create vehicle status and maintenance messages for display in the windows. These messages include information such as "window washer fluid low" and "check tire pressure."

The current displays in vehicles are capable of providing different types of media from a variety of sources. The display provides audio, text, graphic images, and/or video (e.g., night vision display). Additionally, the display provides information from various databases and remote servers using a wireless network. For example, traffic and/or weather alerts is communicated through any of the display means mentioned above. In addition, smart advertising is transmitted to the display to inform the driver of a nearby restaurant or store. Providing all of these types of information and media can be helpful to the driver but providing it without considering the current driving situation may result in increased driver workload, driver distraction and/or decreased driving performance.

BRIEF DESCRIPTION OF THE INVENTION

One aspect of the present invention is a method for estimating workload placed on the driver of a vehicle. The method comprises receiving workload estimation data. Driving conditions responsive to the workload estimation data are detected. An impact value of at least one of the driving conditions is calibrated and the impact values are combined to determine a current driving workload estimate. The current driving workload estimate is then output.

In another aspect, a system for estimating workload placed on the driver of a vehicle comprises a network and a microprocessor in communication with the network. The microprocessor includes instructions to implement a method. The method comprises receiving workload estimation data from the network. Driving conditions responsive to the workload estimation data are detected. An impact value of at least one of the driving conditions is calibrated and the impact values are combined to determine a current driving workload estimate. The current driving workload estimate is then output.

In still another aspect, a computer program product for estimating workload placed on the driver of a vehicle comprises a storage medium readable by a processing circuit and storing instructions for execution by the processing circuit for performing a method. The method comprises receiving workload estimation data. Driving conditions responsive to the workload estimation data are detected. An impact value of at least one of the driving conditions is calibrated and the impact values are combined to determine a current driving workload estimate. The current driving workload estimate is then output.

BRIEF DESCRIPTION OF THE DRAWINGS

Referring to the exemplary drawings wherein like elements are numbered alike in the several FIGURES:

FIG. 3 is a table of logical operands associated with driving workload estimation in an exemplary embodiment of the present invention.

DETAILED DESCRIPTION OF THE INVENTION

Disclosed herein is a method of driving workload estimation. Briefly stated, the method utilizes vehicle data, environment data and current task data to estimate the workload placed on the vehicle driver. A conditional model of the driver's workload (herein identified as driving workload) is developed by assessing the marginal effect of the vehicle, environment and current tasks on the driver. Multiple levels or states of the driving workload are estimated by workload estimation software. In an exemplary embodiment, the estimated workload states include an instantaneous workload estimate, an intermediate workload estimate and an overall workload estimate. Alternatively, the system may utilize a single workload estimate, provided that some method of accounting for the lingering impact of events and conditions that are no longer occurring is taken into account by the workload estimate. These estimated workload states are output and may be sent to a vehicle information management system to aid in controlling the messages being sent and the functionality available to the operator of the vehicle.

Figure 1:
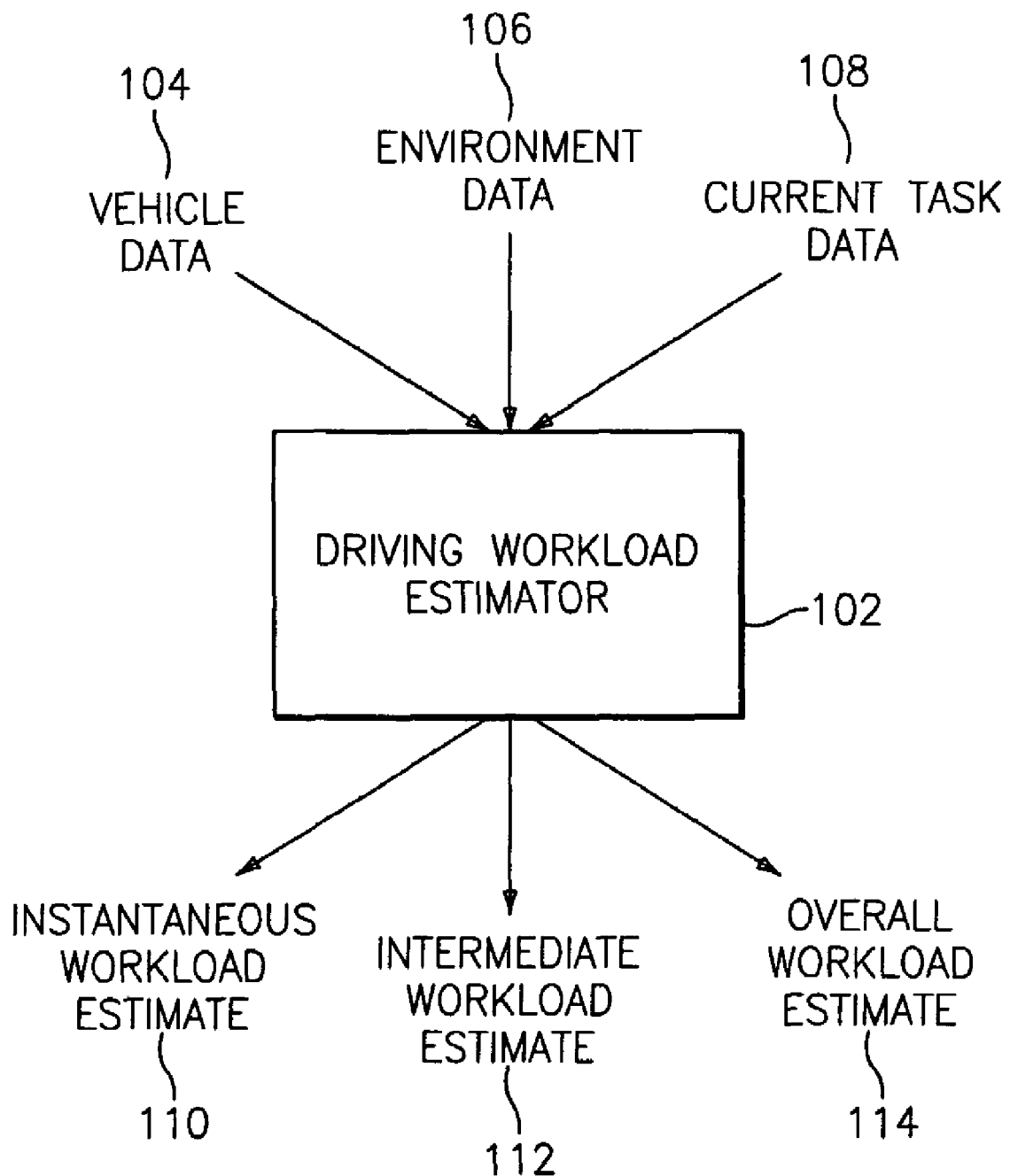
FIG. 1 is a block diagram of an exemplary system for performing driving workload estimation.

FIG. 1 is a block diagram of an exemplary system for performing driving workload estimation. Workload estimation data including vehicle data 104, environment data 106 and current task data 108 are input to a driving workload estimator 102. The driving workload estimator 102 includes application code for creating an instantaneous workload estimate 110, an intermediate workload estimate 112 and an overall workload estimate 114. In an exemplary embodiment, the driving workload estimator 102 is located on a microprocessor contained in the vehicle. The microprocessor may be dedicated to performing driving workload estimator 102 functions or, alternatively, the microprocessor may include application code for performing other vehicle functions along with the driving workload estimator 102 functions. In addition, storage space for intermediate application results as well as application inputs and outputs may be located on the microprocessor or located on an external storage device accessible by the microprocessor.

Vehicle data 104 is internally generated and is received from sensors located inside the vehicle. Vehicle data 104 may include information such as vehicle speed, cruise control state, turn signal status, traction control status (TCS), antilock braking system (ABS) status, vehicle stability system data, powertrain data, steering wheel angle, brake pedal position and throttle pedal position data. Powertrain data may include information such as revolutions per minute (RPM), spark data and fuel data. Environment data 106 may include external light sensor/headlamp status data, wiper status, defroster status, outside air temperature (OAT), global positioning system (GPS) data, time of day, and enhanced digital maps. Current task data 108 includes data such as radio information (e.g., is manipulation occurring) and phone information (e.g., is the phone active). In addition, driver identification input to the driving workload estimator 102 may be utilized to tailor the workload estimates to a particular driver of the vehicle. Additional input may include driver monitoring data and input that is scalable to the vehicle sensor set and the equipment package (e.g., navigation, imbedded cell phone). Driver monitoring data includes the ability for the driver, or the vehicle system to revise the driving workload estimate. Additional input data may also include information from an object detection and warning and/or lane sensing application or sensor. Examples include forward collision warning (FCW) data, side object detection (SOD) data, lane departure warning (LDW) data and rear collision warning (RCW) data. Further input to the driving workload estimator 102 may include infotainment and telematics system status; speech interface status and diagnostics data; and adaptive cruise control (ACC) system data.

The specific inputs to the driving workload estimator 102 may vary between implementations depending on the input data available in a particular vehicle and the requirements of a particular implementation. A network may be utilized to obtain the data and the network may be internal to the vehicle or the network may provide access to information outside the vehicle. Any information that may be sensed, measured or input through an interface (e.g., wireless network) may be used as input to the driving workload estimator 102. Environment data 106 may be expanded to include information such as vehicle location data; external vehicle location data; traffic information both present and predicted; and weather information both present and predicted. As depicted in FIG. 1, in an exemplary embodiment of the present invention, three workload estimates are output from the driving workload estimator 102. The workload estimates are updated on a periodic basis and include numeric values that reflect relative workload levels. The workload estimate may be relative to a starting state such as clear driving at normal speed or driver workload when the vehicle is stationary. In an alternate embodiment, data in addition to the numeric values may be included in the workload estimates.

The instantaneous workload estimate 110 is based on a short-term time frame (e.g., the preceding zero to three seconds). For example, a turn signal coupled with a particular steering wheel angle may indicate that the vehicle is turning. The act of turning would have an impact on the instantaneous workload because it will add to the current driving workload and is generally completed in a few seconds. The intermediate workload estimate 112 is a workload based on an intermediate time interval (e.g., twenty seconds to one minute, three seconds to three minutes, three seconds to ten minutes). The intermediate workload estimation will carry a declining balance input on workload estimates for recent events. For example, if the input data indicates that the driver has just merged into traffic or that the ABS brake system is activated, the intermediate workload estimate 112 would reflect these events for a specified intermediate time interval. This may be implemented by having the estimator initiate a sub-routine that causes the workload estimate to remain above the starting state due to the fact that the effect of an ABS event does not end as soon as the ABS stops being activated. An event that affects the intermediate workload estimate 112 includes some recovery time for the driver and this is reflected in the length of time that the workload estimate continues to reflect the occurrence of the event.

The overall workload estimate 114 includes long term workload or total workload accumulated during an ignition cycle (e.g., from three minutes and up, ten minutes and up, entire ignition cycle). For example, the length of time that the driver has been operating the vehicle may be factored into the overall workload estimate 114. In an exemplary embodiment, each workload estimate is associated with from three to one hundred workload level values. In an alternate embodiment, hundreds or thousands of workload level values may be associated with each workload estimate.

Figure 2:
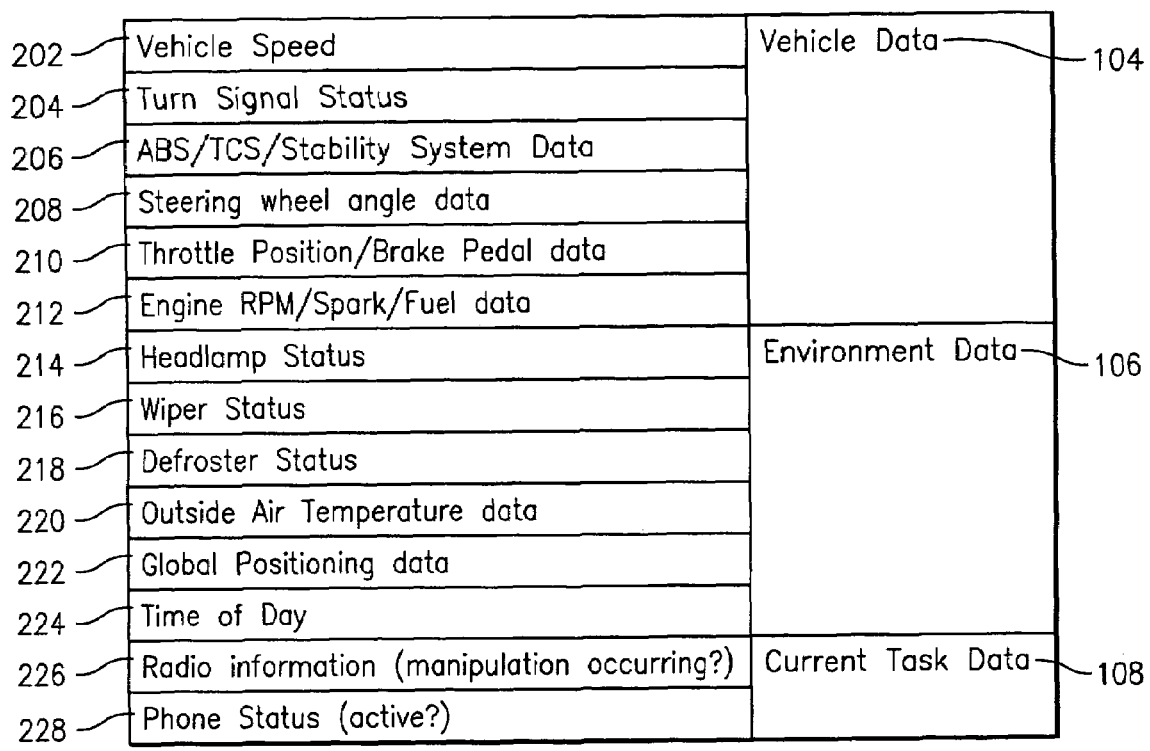
FIG. 2 is a table of exemplary driving workload estimate inputs.

The input data depicted in FIG. 2 may be utilized by a driving workload estimator 102 to calculate the driving workload estimate as a function of vehicle data 104, environment data 106 and current task data 108. Referring to the vehicle data 104 in FIG. 2, the value of vehicle speed 202 may be calculated based on the current speed of the vehicle and whether the driver is accelerating or decelerating. The value of turn signal status 204 may be determined based on whether the turn signal is activated. The value of ABS/TCS/stability system data 206 may be calculated from sensor data gathered from dynamic vehicle controls such as the wheel speed sensors. The steering wheel angle data 208 is determined by sensors capable of determining the rate of vehicle turning. Brake and throttle pedal position data 210 may be determined by the data gathered from sensors such as the throttle position sensor (TPS) and brake pedal switch or sensor. The value of engine RPM/spark/fuel data 212 (powertrain data) may be calculated from engine management sensors and data (e.g., the TPS).

Referring to the inputs relating to environment data 106 in FIG. 2, the value of headlamp status 214 may be determined by either the external light sensor or by data from the headlamp controls. The value of wiper status 216 may be determined by either a rain sensor or the wiper controls. The value of defroster status 218 may be determined by the defroster controls. The outside air temperature (OAT) data 220 may be determined by a sensor dedicated to that purpose. Global positioning data 222 is determined by accessing data from the global positioning system within the vehicle network. Time of day 224 is determined from the clock data within the vehicle. Referring to the inputs relating to current task data 108 in FIG. 2, radio information 226 is determined by accessing vehicle data regarding radio feature and function activity. Phone status 228 is determined by accessing existing vehicle data pertaining to an integrated cellular phone system. The values associated with the input data in FIG. 2 is input to a function. The function is located in the driving workload estimator 102 and it utilizes the input data to determine the instantaneous workload estimate 110, the intermediate workload estimate 112 and the overall workload estimate 114.

FIG. 3 is a table of logical operands associated with driving workload estimation for use by a function to calculate a driving workload estimate in an exemplary embodiment of the present invention. The logical operands are used to create a framework and to set initial weightings of the driving workload estimation and may be modified to fine tune the driving workload estimator 102. A workload estimate is calculated to reflect an instantaneous workload estimate 110, an intermediate workload estimate 112 and an overall workload estimate 114 based on assigning numeric values to each of the conditions depicted in FIG. 3. Numeric values and inputs may be the same for all three workload estimates or they may vary. As shown in FIG. 3, the value of the relative workload effect associated with vehicle speed 202 may be calculated by assigning a numeric value to the results of applying the vehicle speed equations 302. A vehicle traveling between twenty miles per hour and fifty miles per hour may be given a higher speed value than a car traveling between zero miles per hour and twenty miles per hour. Similarly, a vehicle traveling between fifty miles per hour and seventy miles per hour may be given a higher speed value than a car traveling between twenty miles per hour and fifty miles per hour. A vehicle traveling over seventy miles per hour may be given a higher speed value than a car traveling between fifty miles per hour and seventy miles per hour. The value of the relative workload for turn signal status 204 may be calculated by assigning a higher numeric value if the turn signal is activated than if the turn signal is not activated, as reflected in the turn signal status equations 304. As shown in the ABS/TCS/stability equations 306, situations where the ABS, TCS and/or vehicle stability system are active may be given a higher value than when they are not.

Referring to FIG. 3, the value of the relative workload for external conditions including headlamp status 214, wiper status 216, outside air temperature 220 and time of day 224 may be calculated by assigning numeric values to the results of applying the corresponding equations. Night may be given a higher relative value than day as reflected in the headlamp status equations 308, precipitation may be given a higher relative value than no precipitation and snow may be given a higher numeric value than rain as reflected in the wiper status equations 310 and the outside air temperature equations 312. The relative value associated with time of day 224, as reflected in the time of day equations 314, may be calculated by assigning higher numeric values as the current time gets further away from noon and closer to midnight. In an alternate embodiment, the value for time of day 224 may be calculated as a sinusoidal cycle with the peak weighting from eleven p.m. to one a.m. and the baseline from noon to one p.m. The relative value associated with the radio information 226 may be calculated using the radio task data equations 316 where the act of manipulating the radio is given a higher relative value than when no radio manipulation is taking place. Similarly, the relative workload value associated with phone status 228 may be calculated by assigning a higher relative value to phone dialing and conversations than to the absence of phone activity. This is reflected in the phone status equations 318.

In an alternate embodiment of the present invention, information from more than one input is utilized to create the workload estimates. For example, the workload estimate may take into account snowy roads if the temperature is below freezing and the windshield wipers are turned on. Additionally, if the ABS brake system is activated then the estimate may take into account the road conditions associated with snowy roads. These kinds of cross grouping combinations may lead to a better estimate of the driver workload. The time span that each value continues to be counted towards a driving workload estimate may depend on whether the workload estimate is an instantaneous workload estimate 110, an intermediate workload estimate 112 or an overall workload estimate 114. For example, the function to calculate an intermediate workload estimate 112 would continue to count the use of ABS or TCS for a specified period of time (e.g., twenty seconds to one minute) while the function to calculate the instantaneous workload estimate 110 would count the use of ABS or TCS for a shorter period of time (e.g., zero to three seconds). In this manner, the three types of workload estimates are created using functions that weight the values assigned to the inequalities over a specified time span. The resulting instantaneous workload estimate 110, intermediate workload estimate 112 and overall workload estimate 114 are then output from the driving workload estimator 102. The output may include transmission to a specified location and logging to a specified location.

Figure 4:
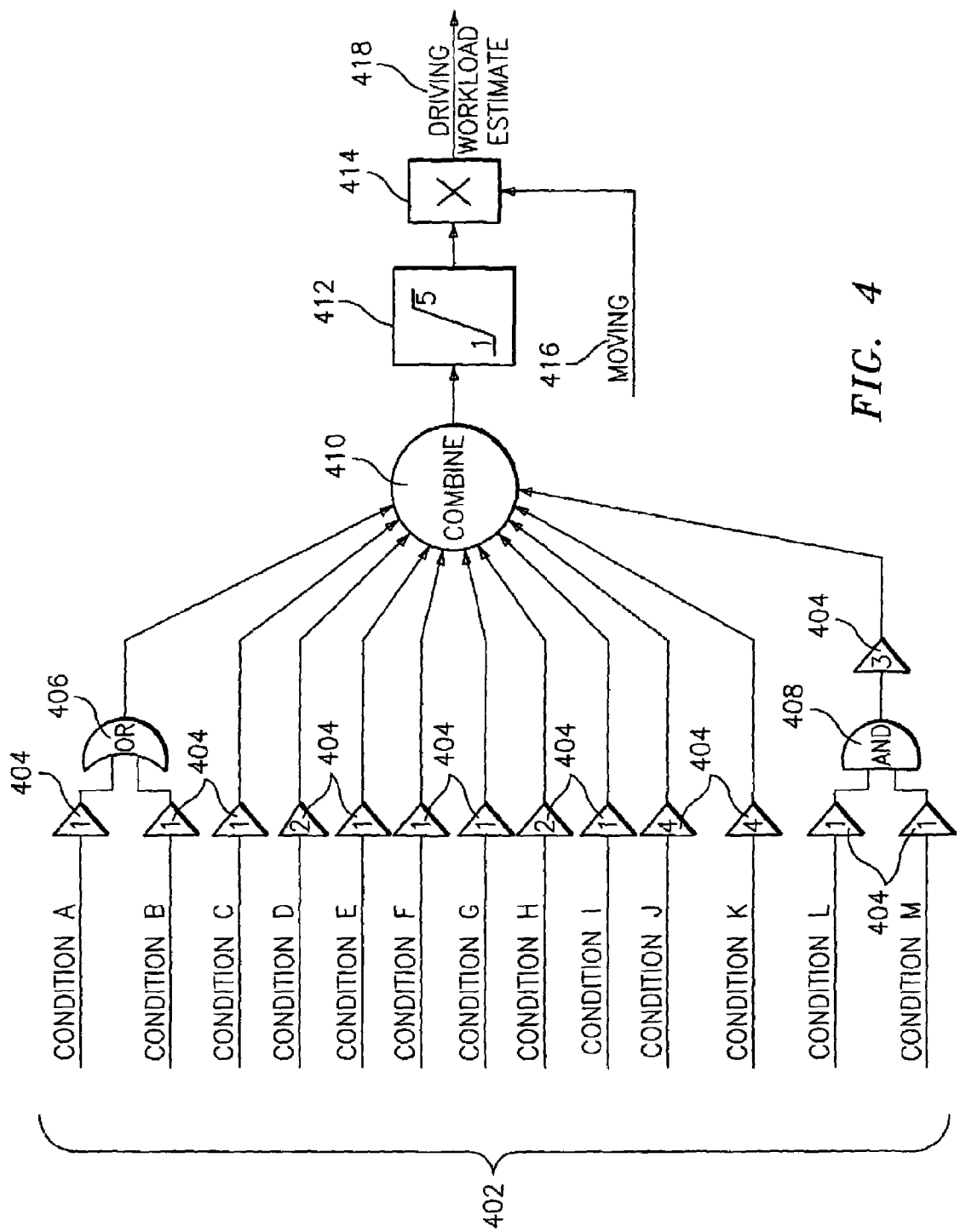
FIG. 4 is a flow diagram of an exemplary workload estimate calculation that may be performed utilizing an exemplary embodiment of the present invention.

FIG. 4 is a flow diagram of an exemplary workload estimate calculation that may be performed utilizing an alternate exemplary embodiment of the present invention. Input to the workload estimate calculation includes specific driving conditions 402 that are detected from information contained in the workload estimation data. The impact values of the driving conditions located are calibrated (e.g., using a weighting scheme) and then combined together. The combined value may then be normalized and output as a driving workload estimate 418. The driving conditions 402 may be extracted from the vehicle data 104, the environment data 106 and the current task data 108. Any information that may be extracted or calculated based on vehicle data 104, environment data 106 and current task data 108 may be extracted and input to the workload estimate calculation as a driving condition 402. For example, data pertaining to vehicle speed 202, ABS/TCS/Stability System 206, throttle position 210, and turn signal status 204 from the vehicle data 104 may be input as driving conditions 402. Similarly, time of day 224, wiper status 216, OAT 220, radio information 226 and phone information 228 from the environment data 106 and current task data 108 may input to the workload estimate calculation as driving conditions 402.

Driving conditions 402 input to the workload estimate calculation may also be derived from combinations of vehicle data 104, environment data 106 and current task data 108. For example, a driving condition 402 called heavy rain may be detected based on a combination of workload estimation data including the wiper status 216, the OAT 220 and ABS/TCS/Stability system data 206. Heavy rain may be detected and input as a driving condition 402 if the wipers are on a high speed, the OAT 220 is above freezing and the automobile traction system is in use (indicating wet road conditions). In another example, a city driving condition 402 may be detected if the GPS data 222 indicates GPS coordinates that correspond to a city location. In a further example, a nighttime driving condition 402 may be detected if the time of day 224 is between 8 p.m. and 6 a.m. (time span may vary based on the time of year) and/or if a light sensor detector in the vehicle indicates less than a preselected amount of light. Any driving condition 402 that may be derived based on combinations of vehicle data 104, environment data 106 and current task data 108 may be implemented utilizing exemplary embodiments of the present invention as input to the workload estimate calculation.

Each driving condition 402 depicted in FIG. 4 has a corresponding weighting factor 404, or workload estimate impact value. The weighting factors 404 are utilized to calibrate the impact of the associated driving condition 402 on the driving workload estimate 418. As depicted in FIG. 4, conditions A, B, C, E, F, G, I, L, and M all have a weighting factor 404 of "1." Also as depicted in FIG. 4, conditions D and H correspond to a weighting factor 404 of "2" and conditions J and K correspond to a weighting factor 404 of "4." The weighting factors 404 are applied as part of the calibrating the impact value of a particular driving condition. Applying a "2" weighting factor 404 implies that the impact value should be doubled for input to the combine function 410 because these driving conditions 402 are thought to have a higher impact on the driver workload estimate then those with a "1" weighting factor. The number and combination of driving conditions 402 and the corresponding weighting factors 404 may vary based on specific implementation requirements. In addition, the specific driving conditions 402 and weighting factors 404 may be updated for a specific implementation based on, for example, field experience and the availability of new vehicle features and/or data.

As depicted in FIG. 4, the driving conditions 402, after applying their corresponding weighting factors 404, are input to a combine function 410. In the example depicted in FIG. 4, driving conditions 402 A and B are input to an "OR" gate 406, meaning that if either of these driving conditions 402 are detected then they should be included in the combine function 410 and represent one driving condition 402. Similarly, an "AND" gate 408 is applied to the output of driving conditions 402 L and M, with the output of the "AND" gate 408 being input to a weighting factor 404 of "3" before being input to the combine function 410. In one example, the "AND" gate 408 may be utilized to prevent the presence of a turn or merge driving condition 402 from impacting the driving workload estimate 418 if the hard turn driving condition 402 has also been detected. As described previously, other input gates, weighting factors and driving conditions may be utilized in other embodiments of the present invention and those listed in FIG. 4 are presented as examples of one possible embodiment.

The combine function 410 depicted in FIG. 4 may be performed by the workload estimate function. It may include an additive, multiplicative and/or other type of combination. An additive combination, such as a simple sum, may include adding the weighted value of each of the driving conditions 402 that were detected. This would result in a summation value that would be input to the normalize function 412 to produce a value between one and five. The normalize function 412 may utilize methods such as normalization, transformation and/or bounding on the output of the combine function 410 in order to produce an output is a pre-selected range (e.g., 1–5, 1–10, 1–100).

The output from the normalize function 412 may then be input to an output function 414 for outputting a driving workload estimate 418 if the vehicle is moving as determined by a moving flag 416. Alternatively, the output function 414 may also be gated based on the passage of a pre-selected period of time from outputting a previous driving workload estimate 418. This type of gating may be utilized to create a persistency effect to account for the lingering impact of a high workload situation. For example, a driving workload estimate 418 of four or higher may require a fifteen second weight before outputting a new driving workload estimate 418 and a workload estimate 418 of two or lower may not require any wait time before outputting a new driving workload estimate 419. Any number of thresholds and threshold values may be implemented based on specific requirements. In addition, the output function 414 may also compare the output from the normalize function 412 to the previous driving workload estimate 418. The output function 414 may then output the new workload estimate 418 from the normalize function 412 if it is higher than the previous driving workload estimate 418. In this manner, the impact of a current higher driving workload estimate 418 may be taken into account.

The disclosed invention provides the ability to estimate the workload that a driver is experiencing using data that is already available within a vehicle. Vehicle data, environment data and current task data may be used to create inferences about the driver's current state (i.e., instantaneous workload estimate), short term state (i.e., intermediate workload estimate) and long term state (i.e., overall workload estimate). The workload estimates may be utilized by display functions and controls within the vehicle to determine the timing of particular messages and when to enable or disable particular functions. For example, a message to rotate the tires may be presented to the operator of the vehicle when the workload estimate is on the low side and the operator is more likely to be able to process the information. Having three time spans for the workload estimates provides the ability to track the longer term effects of particular workload estimate elements. The ability to predict the driving workload simultaneously for different time spans may lead to better estimates of the driving conditions and driver's state, resulting in better communication between driver and vehicle. Additionally, this informed interface may potentially result in higher driver satisfaction with the vehicle and/or safer vehicle operation.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for estimating workload placed on the driver of a vehicle, the method comprising:
    receiving workload estimation data;
    detecting driving conditions responsive to said workload estimation data;
    calibrating an impact value of at least one of said driving conditions;
    combining each said impact value to determine a current driving workload estimate; and
    outputting said current-driving workload estimate after the passage of a pre-selected period of time from the outputting of a previous driving workload estimate, wherein said pre-selected period of time varies based on the value of the previous driving workload estimate.

2. The method of claim 1 wherein said workload estimation data includes internally generated vehicle data.

3. The method of claim 1 wherein said workload estimation data includes environment data.

4. The method of claim 1 wherein said workload estimation data includes current task data.

5. The method of claim 1 wherein said calibrating includes applying a weighting algorithm to at least one of said driving conditions.

6. The method of claim 1 wherein said calibrating is performed within one second of said receiving workload estimation data.

7. The method of claim 1 wherein said combining includes a multiplicative operation.

8. The method of claim 1 wherein said combining includes an additive operation.

9. The method of claim 1 wherein said outputting said current driver workload estimate is performed after the passage of the pre-selected period of time from the outputting of a previous if the value of said current driving workload estimate is less than the value of the previous driving workload estimate.

10. The method of claim 1 wherein said current driving workload estimate is expressed as a number ranging from one to five.

11. The method of claim 1 wherein said current driving workload estimate is expressed as a number ranging from one to one-hundred.

12. The method of claim 1 wherein said outputting includes transmitting said current driving workload estimate to a specified location.

13. The method of claim 12 wherein said specified location is a vehicle information management system.

14. The method of claim 1 wherein said outputting includes writing said current driving workload estimate to a log file.

15. The method of claim 1 wherein said workload estimation data includes at least one of vehicle speed, turn signal status, anti-lock brake status, traction control system status, vehicle stability data, steering wheel angle data, brake position data, throttle position data, engine revolutions per minute, spark data and fuel data.

16. The method of claim 1 wherein said workload estimation data includes at least one of headlamp status, wiper status, defroster status, outside air temperature data, global positioning data and time of day.

17. The method of claim 1 wherein said workload estimation data includes at least one of radio information and phone status.

18. The method of claim 1 wherein said workload estimation data includes adaptive cruise control data.

19. The method of claim 1 wherein said workload estimation data includes at least one of forward collision warning data, side object detection data and rear collision warning data.

20. The method of claim 1 wherein said workload estimation data includes lane departure warning data.

21. The method of claim 1 wherein said workload estimation data includes driver identification data.

22. A system for estimating workload placed on the driver of a vehicle, the system comprising:
    a network; and
    a microprocessor in communication with said network, said microprocessor including instructions to implement the method comprising:
    receiving workload estimation data via said network;
    detecting driving conditions responsive to said workload estimation data;
    calibrating an impact value of at least one of said driving conditions;
    combining each said impact value to determine a current driving workload estimate; and
    outputting said current driving workload estimate after the passage of a pre-selected peroid of time from the outputting of a previous driving workload estimate, wherein said pre-selected period of time varies based on the value of the previous driving workload estimate.

23. The system of claim 22 further comprising a vehicle sensor in communication with said network for creating said workload estimation data.

24. The system of claim 22 wherein said network is the Internet.

25. The system of claim 22 wherein said network is a wireless network.

26. The system of claim 22 wherein said outputting said current driving workload estimate includes transmitting said driving workload estimate to a receiving location over said network.

27. A computer program product for estimating workload placed on the driver of a vehicle, the product comprising:
    a storage medium readable by a processing circuit and storing instructions for execution by the processing circuit for performing a method comprising:
    receiving workload estimation data;
    detecting driving conditions responsive to said workload estimation data;
    calibrating an impact value of at least one of said driving conditions;
    combining each said impact value to determine a current driving workload estimate; and
    outputting said current driving workload estimate after the passage of a pre-selected period or time from the outputting of a previous driving workload estimate, wherein said pre-selected period of time varies based on the value of the previous driving workload estimate.

* * * * *